US009276416B2

(12) United States Patent
Kroenke et al.

(10) Patent No.: US 9,276,416 B2
(45) Date of Patent: Mar. 1, 2016

(54) SMART CHARGING SYSTEM

(71) Applicant: Honda Motor Co., Ltd., Minato-ku, Tokyo (JP)

(72) Inventors: Chris Kroenke, Melbourne, FL (US); Aaron Smith, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 130 days.

(21) Appl. No.: 13/954,173

(22) Filed: Jul. 30, 2013

(65) Prior Publication Data

US 2014/0035513 A1 Feb. 6, 2014

Related U.S. Application Data

(60) Provisional application No. 61/679,371, filed on Aug. 3, 2012.

(51) Int. Cl.
*H02J 7/00* (2006.01)
*B60L 3/00* (2006.01)
*B60L 3/04* (2006.01)
*B60L 11/18* (2006.01)

(52) U.S. Cl.
CPC .............. *H02J 7/0021* (2013.01); *B60L 3/0046* (2013.01); *B60L 3/04* (2013.01); *B60L 11/1816* (2013.01); *B60L 11/1862* (2013.01); *B60L 11/1864* (2013.01); *H02J 7/0027* (2013.01); *B60L 2240/545* (2013.01); *B60L 2240/547* (2013.01); *B60L 2240/549* (2013.01); *B60L 2240/80* (2013.01); *B60L 2250/16* (2013.01); *Y02T 10/7005* (2013.01); *Y02T 10/7011* (2013.01); *Y02T 10/7016* (2013.01); *Y02T 10/7044* (2013.01); *Y02T 10/7061* (2013.01); *Y02T 90/14* (2013.01)

(58) Field of Classification Search
CPC ....................................................... H02J 7/0026
USPC .......................................................... 320/107
See application file for complete search history.

(56) References Cited

U.S. PATENT DOCUMENTS

| | | |
|---|---|---|
| 4,061,956 A | 12/1977 | Brown et al. |
| 5,339,018 A | 8/1994 | Brokaw |
| 6,326,767 B1 * | 12/2001 | Small et al. ................... 320/116 |
| 6,424,158 B2 | 7/2002 | Klang |
| 6,930,485 B2 | 8/2005 | Bertness et al. |
| 7,164,257 B2 * | 1/2007 | Johnson et al. ............... 320/134 |
| 2005/0258798 A1 * | 11/2005 | Meier-Engel ................. 320/107 |
| 2011/0316548 A1 * | 12/2011 | Ghantous et al. ............. 324/427 |
| 2014/0350716 A1 * | 11/2014 | Fly et al. ....................... 700/215 |
| 2015/0191162 A1 * | 7/2015 | Dao et al. ...................... 320/107 |

* cited by examiner

*Primary Examiner* — Suchin Parihar
(74) *Attorney, Agent, or Firm* — Arent Fox LLP

(57) ABSTRACT

A smart battery charger having a plurality of charging stations for simultaneously charging a plurality of batteries, such as vehicle batteries, in an efficient manner without overcharging by compensating for the current state of charge and temperature of each one of the batteries while indicating a status of the batteries to an operator.

19 Claims, 5 Drawing Sheets

| BATT NUMBER | STATUS |
|---|---|
| 1 | CHARGING |
| 2 | NO BATTERY |
| 3 | CHARGE DONE |
| 4 | NO BATTERY |
| 5 | NO BATTERY |
| 6 | CHARGING |
| 7 | BAD BATTERY |
| 8 | NO BATTERY |

*FIG. 4*

| BATT NUMBER | STATUS | VOLTAGE | CURRENT | CHG TIME | TEMP |
|---|---|---|---|---|---|
| 1 | CHARGE DONE | 12.939V | 00.068A | 00:11:59:27 | 25C |
| 2 | NO BATTERY | | | | |
| 3 | CHARGE DONE | | | | |
| 4 | NO BATTERY | | | | |
| 5 | NO BATTERY | | | | |
| 6 | CHARGING | 15.492V | 02.050A | 00:00:02:23 | 25C |
| 7 | NO BATTERY | | | | |
| 8 | NO BATTERY | | | | |
| | | 15.501V | 02.300A | | 00C |

Time Since Last Reset 05:01:13:27

*FIG. 5*

SMART CHARGING SYSTEM

CROSS-REFERENCES TO RELATED APPLICATIONS

This application claims the benefit of U.S. Provisional Application Ser. No. 61/679,371, filed on Aug. 3, 2012, and incorporated herein by reference.

BACKGROUND

This application relates generally to a system and method of charging batteries, and more specifically this application relates to a system and method of properly charging a plurality of vehicle batteries that are at different initial states of charge and that can be at different temperatures.

Automobile and motorcycle batteries at assembly plants or storage facilities can discharge when they sit idle for an extended period of time, or are used intermittently. It is desirable to charge such batteries prior to having them installed in a new vehicle. Such charging is desirable to be done relatively quickly.

However, because different batteries can each be at a different state of charge (SoC), and because these batteries can be of different capacities and may be at different temperatures, current charging techniques have occasionally led to over or undercharging situations, which have ultimately led to some batteries being damaged, resulting in warranty claims. A method of charging and a supporting system for such charging that avoids these problems is desirable.

SUMMARY

Provided are a plurality of example embodiments, including, but not limited to, a system for charging one or more batteries, comprising a monitor; a charge current source; a controller; at least one temperature sensor for detecting a temperature of the one or more batteries and for providing resulting temperature data to the controller; at least one voltage sensor for monitoring a voltage of the one or more batteries being charged and for providing resulting voltage data to the controller; and at least one current sensor for monitoring a charge current being provided to the one or more batteries and for providing resulting charging current data to the controller. The controller is adapted for executing a program for controlling the charge current source for charging of the one or more batteries based on the temperature data and the battery voltage and current data, such that the charging of each one of the one or more batteries is independently controlled based on a current state-of-charge of the one or more batteries and also based on the current temperature of the one or more batteries. Furthermore, a charge status of each one of the one or more batteries is displayed on the monitor.

Further provided are any of the above or below systems being further adapted to accept power from a power source provided at a voltage of about 15V to 16V.

Further provided are any of the above or below systems further comprising at least one switch for disconnecting each one of the one or more batteries from the charge current source when the charger determines that charging is complete for that one of the one or more batteries.

Further provided are any of the above or below systems wherein the at least one switch does not connect the one of the one or more batteries until another battery is provided to replace the one of the one or more batteries.

Further provided are any of the above or below systems wherein the controller detects when any of the one or more batteries is below a temperature threshold for disconnection from the charge current source.

Further provided are any of the above or below systems wherein the charge status to be displayed on the display includes indications of when the charging of any of the one or more batteries is complete, and whether any of the one or more batteries is too cold to charge, and whether any of the one or more batteries is bad, and whether any of the one or more batteries is currently being charged.

Further provided are any of the above or below systems wherein the system has a plurality of battery stations, such that each one of the plurality of battery stations is adapted to receive a battery for connecting to the system for charging, and wherein the charge status to be displayed on the display includes indications of when a battery station does not have a corresponding battery connected to the system.

Further provided are any of the above systems further comprising a table including a plurality of battery stations, such that each one of the plurality of battery stations is adapted to receive a corresponding battery for connecting to the system for charging.

Also provided is system for charging a plurality of batteries, comprising: a display; a charging current source; a controller; at least one temperature sensor for each respective one of the batteries for detecting a temperature of the respective one of the batteries and for providing resulting temperature data to the controller; at least one voltage sensor for each respective one of the batteries for monitoring a voltage of the respective one of the batteries and for providing resulting voltage data to the controller; and at least one current sensor for each respective one of the batteries for monitoring a charge current being provided to the respective one of the batteries and for providing resulting charging current data to the controller, wherein, for each one of the batteries: the controller executes a program for controlling the charge current provided to the one of the batteries for charging the one of the batteries based on a state of charge determined by the controller using the temperature data, the battery voltage data, and the current data of the one of the batteries, such that the charging of the one of the batteries is independently controlled based on the determined current state-of-charge of the one of the batteries, and wherein a charge status of each one of the batteries is displayed on the display.

Further provided is a method for charging a plurality of batteries, comprising the steps of:
providing a plurality of battery charging stations;
for each one of the battery charging stations, detecting whether a battery is present in the battery charging station;
connecting each one of the batteries to a battery charging source for charging the batteries;
detecting a current being provided to each one of the batteries by the battery charging source;
detecting a current voltage of each one of the batteries;
detecting a current temperature of each one of the batteries;
for each one of the batteries, determining a state of charge of the battery based on the detected current, the detected current voltage, and the detected current temperature;
charging the batteries based on the determined state of charge of each battery, such that any defective batteries are disconnected from charging and any batteries that are too cold are disconnected from charging, while any batteries that are not fully charged continue to be charged until they are fully charged; and
displaying to an operator a charging status of each one of the batteries.

Also provided is the above method, wherein any batteries that are disconnected because of being too cold are reconnected and charged when their temperature rises above a minimum threshold.

Further provided is the above method, wherein, when a battery has been disconnected for being a defective battery, that battery station cannot be reconnected until the defective battery is removed and replaced.

Also provided are additional example embodiments, some, but not all of which, are described hereinbelow in more detail.

BRIEF DESCRIPTION OF THE DRAWINGS

The features and advantages of the example embodiments described herein will become apparent to those skilled in the art to which this disclosure relates upon reading the following description, with reference to the accompanying drawings, in which:

FIG. 4 is an example display showing battery charge status of an example battery charging system;

FIG. 5 is another example display showing battery charge status of an example battery charging system.

DETAILED DESCRIPTION OF THE EXAMPLE EMBODIMENTS

An example system is disclosed for charging batteries using battery sensors (for detecting presence, voltage, current, and temperature) and a programmable controller (e.g., processor with memory) to control and monitor the charging process of one or more batteries. The system uses extensive knowledge about the functionality, behavior, and charging performance of the specific type of batteries, such as lead acid batteries, and can detect the current state-of-charge (SoC) of each of the batteries in order to apply a desirable charging profile to the battery to avoid over- or under-charging the batteries. Using the system reduces battery charge time and increases battery throughput while avoiding the risk of overcharging damage to the batteries. Automotive lead acid batteries can be charged in as little as one hour, for example. The system can be used for 12V vehicle batteries, 6V vehicle batteries, or other vehicle or non-vehicle battery systems.

The system can be implemented using a charging table, for example, having a plurality of charging stations, with each charging station being adapted for receiving a battery for charging and/or evaluation. Currently, systems having eight charging stations are contemplated, but other numbers of stations can be accommodated.

A display can be included to provide a status notification to operators for all of the batteries being charged, and to indicate which charging stations do not have a battery installed and thus are ready to receive one. The status notifications are designed so that non-technical individuals can determine the status and make appropriate decisions regarding the batteries.

The method of charging the batteries takes into account variability in battery charge states, battery temperature, and inherent battery characteristics, such as for lead acid batteries, the internal resistance of the battery increases as the state of charge increases in a healthy battery, and that battery temperature influences optimum charging strategies. A goal is to efficiently charge a plurality of batteries at basically the same time without damaging any of the batteries through overcharging.

Figure 1:
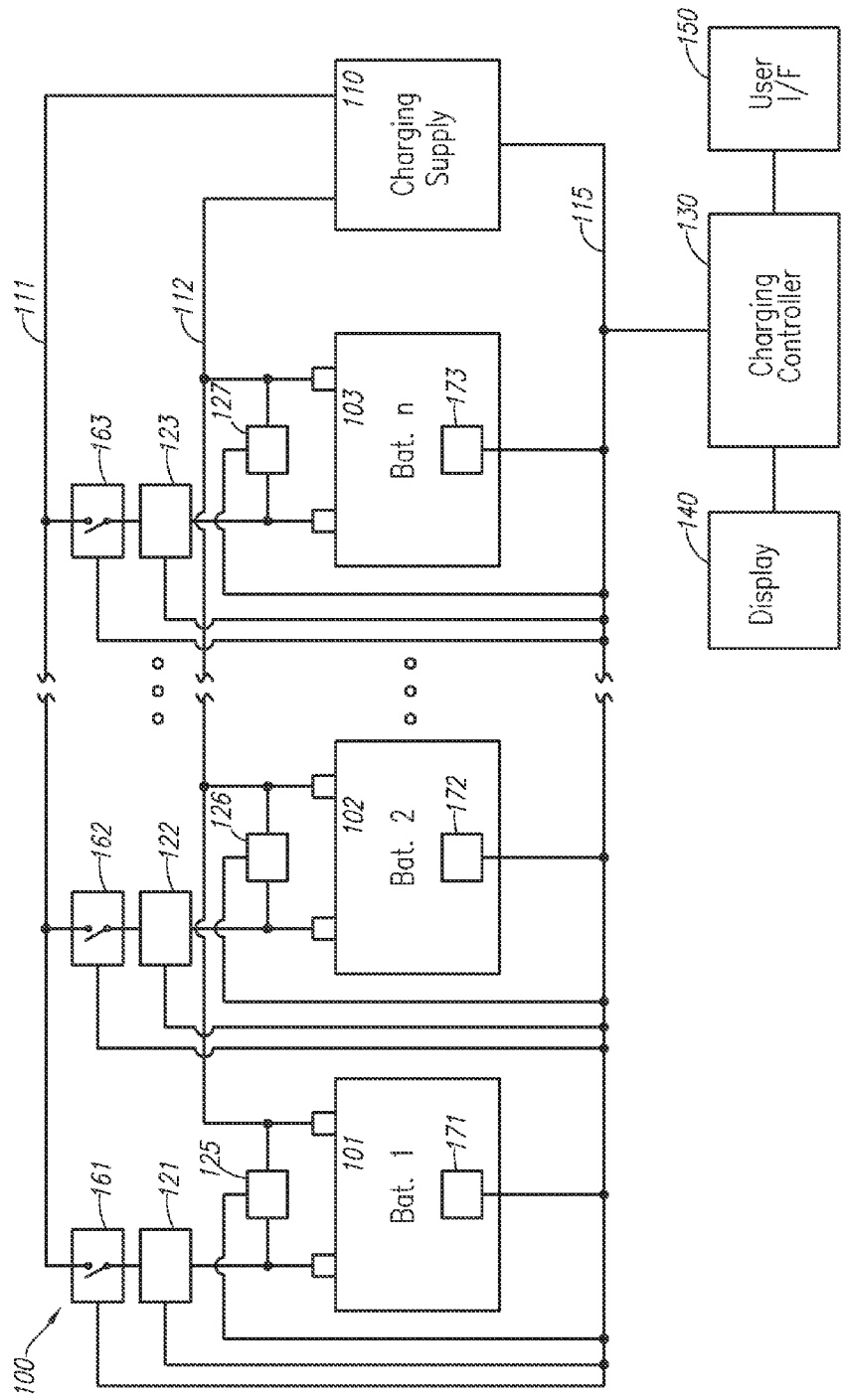
FIG. 1 is a block diagram of an example embodiment of a smart charging system as described herein.

FIG. 1 shows one example embodiment of such a smart charging system 100. The system is provided to charge a plurality of batteries 101, 102 . . . 103, each one of which may exhibit a different state of charge and/or may be at a different temperature, and some of which may prove defective and hence cannot, and should not, be charged. The system can be designed to have a plurality of battery stations, each for holding one of the batteries being charged. The example system is capable of charging eight or more such batteries simultaneously. Each one of the batteries is connected to a charging power supply 110 via a positive power cable 111 and a negative power cable 112. Any stable 15-16 volt power supply that can supply the desired charging currents and could be used as the charging power supply 110.

The current supplied to each one of the batteries 101, 102 . . . 103 by the cables 111, 112 is monitored by a corresponding one of a plurality of current detectors 121, 122 . . . 123, each arranged to detect the current of a respective one of the batteries. Such a current detector might comprise a coil for monitoring the current flowing through the positive battery terminal, for example. Other means of detecting the current supplied to the batteries could also be utilized as is known in the art of current detection.

The voltage across each one of the batteries 101, 102 . . . 103 is detected by a corresponding one of a plurality of voltage detectors 125, 126 . . . 127 each provided across the terminals of a respective one of the batteries to detect the voltage of the respective batteries. Means of detecting voltage known in the art, such as using a voltmeter, could be utilized.

The plurality of current detectors 121, 122 . . . 123 and the plurality of voltage detectors 125, 126 . . . 127 can all be connected to a data bus 115 for communicating with a charging controller 130. The voltage detectors and the current detectors can be adapted to digitally communicate the respective voltages and currents of the various batteries being charged to a charging controller 130 so that the controller is continuously or periodically made aware of these values, and hence can monitor the charging of the batteries 101, 102 . . . 103 and determine their respective state-of-charge. The data bus 115 could be an Ethernet network or one or more a serial buses (e.g., USB), for example. Alternatively, the data bus 115 could be comprised of a plurality of analog connectors to connect the current and voltage detectors individually to the controller 130.

In one alternative embodiment, a single battery monitoring system (BMS) sensor (not shown) is used to provide both the current detector and the voltage detector used for each one of the batteries. Such BMS sensors are available over-the-counter and are readily obtained and/or replaced. The BMS sensor might be integrated into the connector for connecting to a terminal of each one of the batteries. The connector could include an alligator-type connector, for example.

The controller 130 can also be digitally connected to the charging power supply 110, such as by data bus 115, for example, or by a different connection, to monitor and control the operation of the charging power supply 110 according to the methods discussed herein. However, in at least one alternative embodiment, the charging supply 110 is a dumb supply that is not connected to the charging controller 130 and need not be automatically controlled.

A plurality of relays 161, 162 . . . 163 are provided each connected to a terminal of a respective one of the batteries 101, 102 . . . 103 to connect/disconnect each one of the batteries to/from the charging power supply 110, for starting and stopping the charging of the individual batteries and for isolating the batteries and the battery connectors from the power supply. These relays 161, 162 . . . 163 are also connected to the charging controller 130, such as via the data bus 115 or by direct analog connection, so that the charging controller 130 can individually control the operation of each one of the relays. These relays can be used to start/stop the charging operation, safely disconnect the batteries from the charging power supply, and temporarily disconnect the batteries from charging to detect the actual battery voltage, as needed, all under the control of the charging controller 130. As an alternative, solid state switches or other types of switches could be used as an alternative to the relays, if desired.

A plurality of temperature sensors 171, 172 . . . 173 are provided, each one in contact with a respective one of the batteries 101, 102 . . . 103, to monitor the temperature of each one of the batteries. These temperature sensors 171, 172 . . . 173 are each connected to the data bus 115 to provide the battery temperature data to the charging controller 130 so that the controller can monitor the temperatures of the batteries in order to implement the charging. Alternatively, the temperature sensors 171, 172 . . . 173 may be connected to the charging controller 130 using individual analog connections. These temperature sensors 171, 172 . . . 173 may be attached to the respective batteries to be monitored, or the sensors may be placed on a platform on which the batteries will sit in order to be in contact with the base of the batteries. As an alternative, temperatures sensors that can remotely detect the temperatures of the batteries without physical contact might be used, such as infrared detectors, for example.

A display 140 and a user interface 150 are provided connected to the charging controller 130 so that charging information and status can be displayed to an operator (e.g., via display 140) and so that the operator can enter control commands and parameters (e.g., via user interface 150). The user interface 150 might utilize a keyboard, a mouse, individual switches, a touchscreen, or other type(s) of input device(s), or combinations thereof. Such a user interface can be used by a user (operator) to enter commands and/or data into the system. For example, the interface might be used to indicate the type of batteries being charged, their sizes, whether a battery is installed at a given station, the battery source or manufacturer, whether to stop the charging (e.g., emergency shutoff), etc. The system might prompt the operator for certain desired inputs as well.

Battery detecting station sensors (not shown) can be provided to detect the presence or absence of a battery in any of the battery stations. Such sensors might detect the mass (weight) of the battery, or an electric eye or other detector could be used to detect the presence of the battery, with these sensors being used for notifying the controller of such presence (or absence) of batteries in a given station. Alternatively, the operator might notify the controller using the user interface 150 whether a battery is installed in a given station or not. As another alternative, the battery connectors may be used to detect whether a battery has been installed, such as by detecting a voltage, even a residual voltage, using the voltage detectors 125, 126 . . . 127.

The charging controller 130 could be a custom designed control device using a commercially available controller or processor, or a general purpose computing device with an appropriate data (digital or analog, as desired) interface that is programmed as required to support the charging process disclosed herein. Such a controller might even be remotely located or based in the "cloud", for example, with data bus 115 utilizing the Internet for communication. This system 100 allows all of the batteries to be individually monitored during the charging process, and it allows the charging process to be tailored to the state of each one of the batteries, avoiding any over- or under-charging of the batteries.

Using a system such as provided in FIG. 1 and described above, the charging process was tested on a number of batteries in order to discover an optimum charging strategy that can charge a plurality of batteries having different initial states of charge (SoC) and provided at different temperatures in an efficient manner without overcharging the batteries. During testing, the correlation of battery charge acceptance to the SoC of the batteries was determined for at least one particular type of batteries (e.g., for lead acid batteries typically used for starting vehicle engines). Using this data, an optimized charging methodology was developed and is described below.

Figure 2:
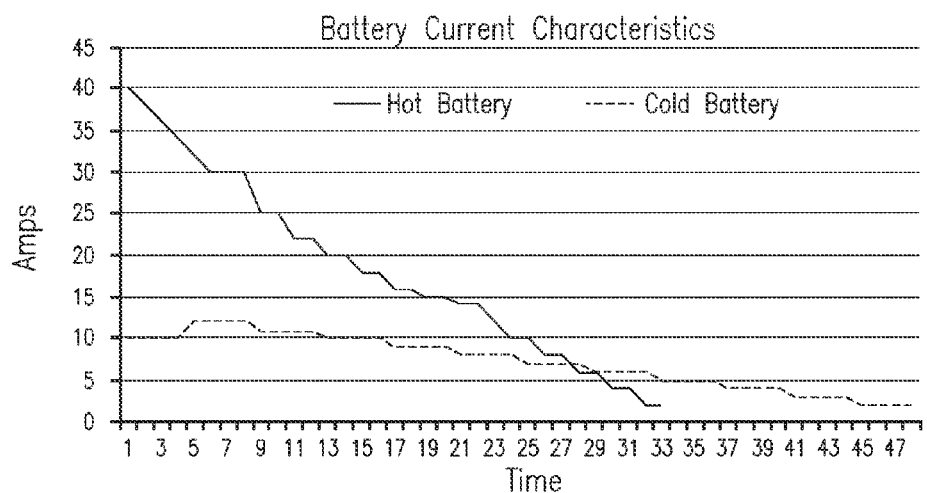
FIG. 2 is a time plot of example battery current characteristics of a hot and cold battery.

For example, FIG. 2 shows battery current characteristics for the charging of hot batteries vs. the charging of cold batteries. As shown, proper charging for cold batteries takes considerably longer, and lower currents are used in the earlier portions of the charging process. In other words, colder batteries are charged more slowly than warmer batteries.

Figure 3B:
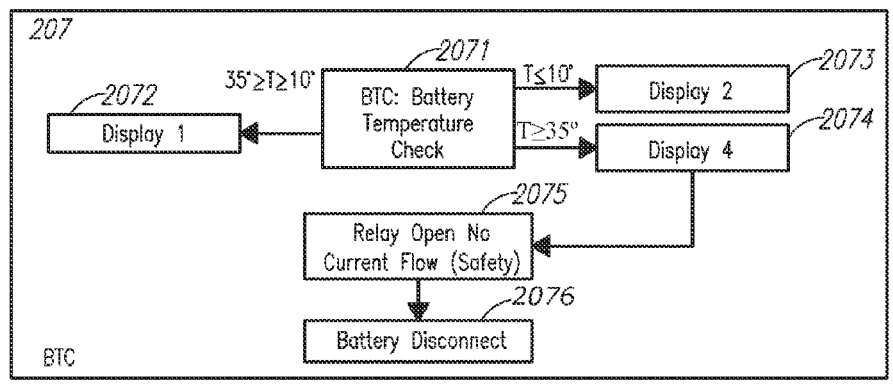
FIG. 3B is a flow chart providing an example battery temperature check procedure that can be used with the example procedure for smart charging the batteries.
Figure 3C:
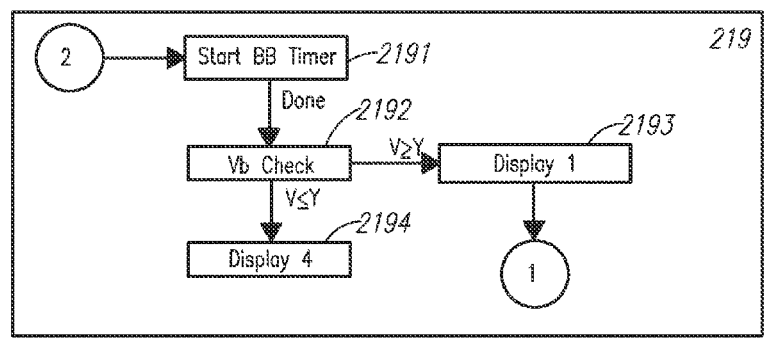
FIG. 3C is a flow chart providing an example battery voltage check procedure that can be used with the example procedure for smart charging the batteries.
Figure 3A:
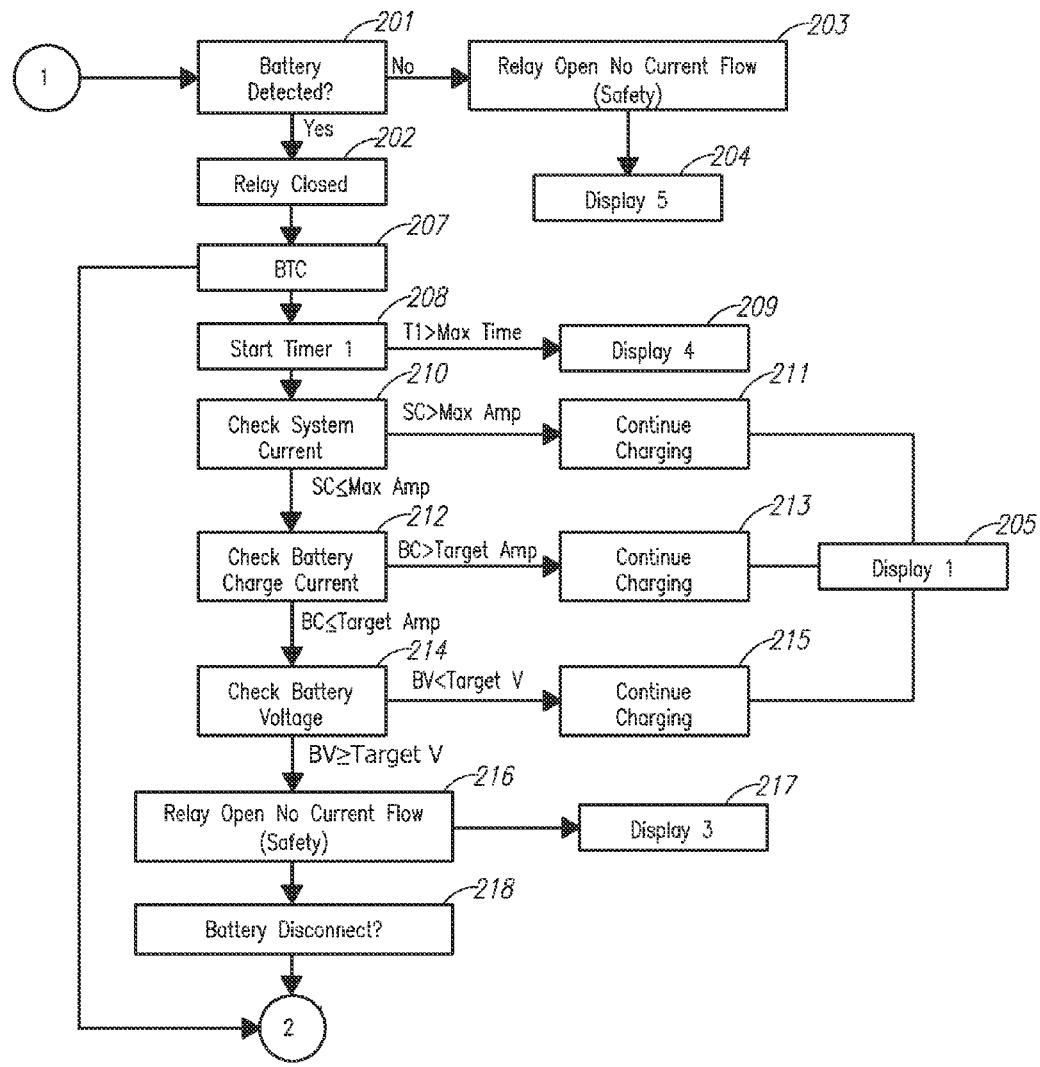
FIG. 3A is a flow chart providing an example procedure for smart charging batteries using an example system.

FIG. 3A is a flow chart showing an example process for charging the battery using an example system such as provided in FIG. 1. This process can be implemented by programming the charging controller using the proper programming approach to practice this method.

Referring to FIG. 3A, once the process is started, the battery at each location is detected 201 (such as by using the battery detecting sensor to detect if a battery has been installed at a given battery station, for example, or by using an electric eye, or some other detection method such as an operator input). If a battery is detected, the corresponding relay is closed 202, but if no battery is detected, the relay remains opened 203 for safety reasons, and Display 5 ("NO BATTERY") is displayed 204 to the operator on the display for that battery (see TABLE 1 for a description of the various information being displayed to the operator). If the battery is detected and the relay closed, the battery undergoes a BTC (battery temperature check) step 207 (described in more detail with respect to FIG. 3B, below). If the battery temperature check passes, the Timer 1 is started 208 and charging is started. While any given battery is being charged, the Display 1 ("CHARGING") is displayed 205 for that battery. Should the timer exceed a maximum time (T1>max), it is determined that the battery is not properly charging, Display 4 ("BAD BATTERY") is displayed, and the relay is opened for that battery and the charging for that battery stops.

Otherwise while the timer is less than the maximum time (T1<max), the system current SC provided by the entire system is monitored 210 during charging 211 to avoid overloading the system. The charge current BC of each battery is monitored 212 and charging for each battery continues 213 as long as the charge current BC is above a threshold target. When the charging current BC falls below the threshold charging current for any given battery, the voltage BV of that battery is checked 214. If the measured voltage BV of a battery is below a target voltage, the battery continues to be charged 215 until the battery voltage BV is equal to, or slightly greater than, the target voltage, in which case the relay for that battery is opened 216, Display 3 ("CHARGE DONE") is displayed 217, and the battery is disconnected from the charging system 218 and is fully charged and ready to be removed.

TABLE 1

| | | |
|---|---|---|
| DISPLAY 1 | CHARGING | Battery charging is still in process. Please allow "Charge Done" message to appear before using battery. |
| DISPLAY 2 | COLD BATTERY | The battery is cold and will not charge completely. Battery can be left on charger to warm up or remove and charged later. |
| DISPLAY 3 | CHARGE DONE | Charging process is complete. Battery can be removed. The System has automatically disconnected the charging terminals to prevent overcharging and increase safety. |
| DISPLAY 4 | BAD BATTERY | The battery has an internal defect detected during the charging process. The battery requires further analysis. Suspect a Supplier or Manufacturing Department issue. |
| DISPLAY 5 | NO BATTERY | There is no battery detected at that charging station (location). |

FIG. 3B shows an example battery temperature check process that can be used with the flow chart of FIG. 3A. In this process, the battery temperature is monitored for being below a minimum threshold (where the battery cannot be efficiently charged) or rising above a maximum temperature threshold while charging (where the battery is defective and cannot be charged). The temperature of the battery is measured 2071. If the measured temperature is less than or equal to a minimum threshold (e.g., 10 degrees C.), Display 2 ("COLD BATTERY") is displayed 2073 and charging is put on hold (or slowed). However, if the measured temperature is between minimum and maximum thresholds (e.g., between 10 and 35 degrees C.), Display 1 ("CHARGING") is displayed and the battery is charged in a normal manner according to the flow chart of FIG. 3A. However, if the measured temperature of the battery is greater than the maximum threshold (e.g., 35 degrees C.), then Display 4 ("BAD BATTERY") is displayed 2074, the relay for that battery is opened 2075 and that battery is disconnected 2076. Note that this process can be adapted to monitor the temperature of those batteries that are too cold to fully charge (such as by looping through this flow) and reconnecting the cold batteries for charging when their temperature rises above the minimum threshold.

FIG. 3C shows a flow chart of an optional timing check operation to monitor to ensure that a charged battery is able to maintain its charge. Once the battery is charged according to the process of FIG. 3A, a timer can be started 2191 and the battery voltage is checked 2192 when the timer expires. If the battery voltage is properly maintained above a desired threshold, Display 1 ("CHARGING") is displayed 2193 and the battery charge is maintained (such as by a trickle charge) by continuing the process of FIG. 3A, or Display 3 (CHARGE DONE") is displayed. But if the battery voltage has dropped below the threshold, the battery is considered defective and Display 4 ("BAD BATTERY") is displayed 2194.

Note that for the above process, each battery is independently monitored and charged, and hence the process is tailored to the current state of any given battery, ensuring that each battery is efficiently charged without overcharging. This also allows batteries to be added and removed from the system in a random manner.

FIG. 4 shows an example display that shows to the operator the status of every battery being charged. In this example, two batteries are charging, one battery is indicated as being defective, one battery has been charged, and the remaining four locations have no battery installed and are so indicated.

FIG. 5 shows another example display that, in addition to information similar to that described above for FIG. 4, also indicates the current voltage and current of each charging battery, the charging time, and the battery temperature. All of this information is provided by the charging controller 130 for display by the display 140. Such a display can be useful for engineering and diagnostic functions, and may be provided as an option in addition to the display of FIG. 4.

Figure 6:
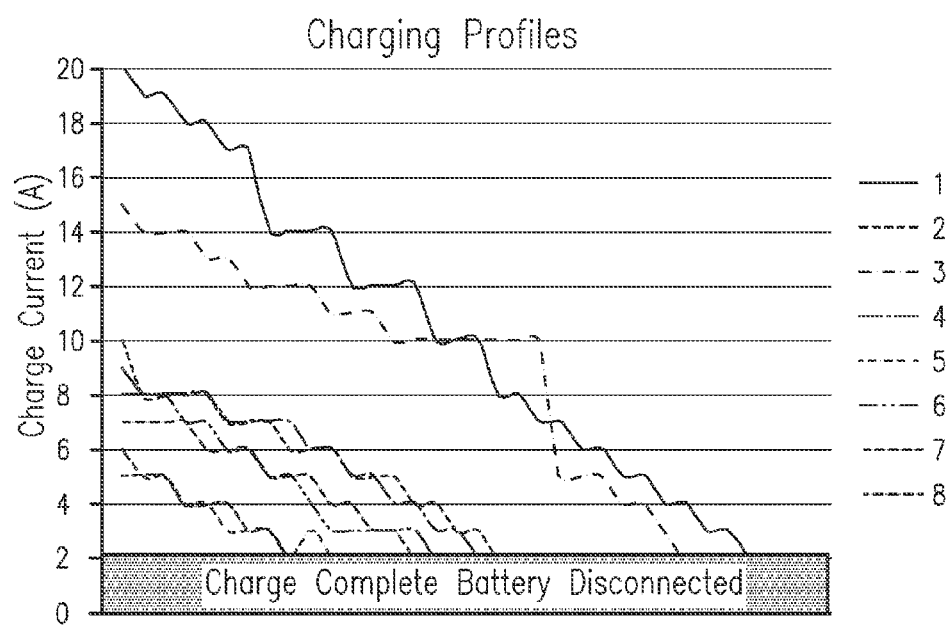
FIG. 6 is a time plot of charging profiles for a plurality of batteries being smart charged using an example charging system.

FIG. 6 shows example charging profiles for eight different batteries that were charged according to the disclosed methodology using a system such as described herein. Note that each one of these batteries was charged using a slightly different profile, indicating the flexible nature of the charging process described herein.

Additional features can be provided for alternative embodiments to improve the functionality of the system. For example, once a battery is determined to be defective or fully charged by the system, it is automatically disconnected from the charging system. The system can prevent that battery from being re-connected to the charging system until it is detected that the battery has been removed, and another battery put in its place. Generally, it is desirable not to activate the power on a set of battery connectors until it is detected that there is a battery installed in that battery station.

The disclosed system is designed for charging lead acid batteries, but it could be adapted for charging any of a number of types of batteries, such as Ni-Cad, Lithium Ion, or Nickel-metal hydride, among others. For those batteries, the SoC profile will be different and may need to be determined by testing, but the basic methodology can still be utilized.

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be necessary to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

What is claimed is:

1. A system for charging a plurality of batteries, comprising:
   a display;
   a charging current source;
   a controller;
   at least one temperature sensor for each respective one of said batteries for detecting a temperature of the respective one of said batteries and for providing resulting temperature data to the controller;
   at least one voltage sensor for each respective one of said batteries for monitoring a voltage of the respective one of said batteries and for providing resulting voltage data to the controller; and
   at least one current sensor for each respective one of said batteries for monitoring a charge current being provided to the respective one of said batteries and for providing resulting charge current data to the controller, wherein, for each one of said batteries:
  said controller executes a program for controlling the charge current provided to the one of said batteries for charging the one of said batteries based on a state of charge determined by the controller using the temperature data, the battery voltage data, and the current data of the one of the batteries, such that the charging of the one of the batteries is independently controlled based on the determined current state-of-charge of the one of the batteries, and wherein
  a charge status of each one of the batteries is displayed on the display.

2. The system of claim 1, wherein the system is adapted to accept power from a power source provided at a voltage of about 15V to 16V.

3. The system of claim 1, further comprising at least one switch connected to said controller for each respective one of said batteries for disconnecting the respective one of said batteries from the charge current source when the controller determines that charging is complete for the respective one of said batteries.

4. The system of claim 3, wherein the controller is adapted such that, once disconnected, the at least one switch does not reconnect the one of said batteries until another battery is provided to replace said one of said batteries.

5. The system of claim 3, wherein the controller is adapted to detect when any of the batteries is below a temperature threshold for disconnection from the charge current source to stop charging such battery(s).

6. The system of claim 1, wherein the charge status to be displayed on the display includes indications of when the charging of any of the batteries is complete, when any of the batteries is too cold to charge, and when any of the batteries is currently being charged.

7. The system of claim 6, wherein the controller is adapted to detect when any of the batteries is defective, and wherein the charge status for such defective batteries is indicated by the display.

8. The system of claim 6, wherein the system has a plurality of battery stations, such that each one of the plurality of battery stations is adapted to receive a battery for connecting to the system for charging, and wherein the system is adapted to notify the controller whether a battery is installed in each one of the charge stations, and wherein the charge status to be displayed on the display includes indications of when a battery station does not have a corresponding battery installed in the battery station.

9. The system of claim 1, wherein the system has a plurality of battery stations, such that each one of the plurality of battery stations is adapted to receive a battery for connecting to the system for charging, and wherein the system is adapted to notify the controller whether a battery is installed in each one of the charge stations.

10. The system of claim 1, wherein the controller is adapted to detect when any of the batteries is defective.

11. The system of claim 1, wherein said system is adapted to charge all of the batteries that are not defective and not too cold in about one hour.

12. The system of claim 1, wherein said system is adapted to simultaneously charge the batteries even when the batteries have different initial states of charge such that said system is adapted to avoid overcharging any of said batteries.

13. A system for charging a plurality of lead acid batteries, comprising:
  a display;
  a charging current source;
  a controller;
  a plurality of battery charging stations;
  at least one station detector for each respective one of the battery charging stations for detecting the presence of a respective one of the batteries installed in the respective station;
  at least one switch connected to said controller for each respective one of said batteries for disconnecting the respective one of said batteries from the charge current source when the controller determines that charging is complete or the battery is defective for the respective one of said batteries
  at least one temperature sensor for each respective one of said batteries for detecting a temperature of the respective one of said batteries and for providing resulting temperature data to the controller;
  at least one voltage sensor for each respective one of said batteries for monitoring a voltage of the respective one of said batteries and for providing resulting voltage data to the controller; and
  at least one current sensor for each respective one of said batteries for monitoring a charge current being provided to the respective one of said batteries and for providing resulting charge current data to the controller, wherein, for each one of said batteries:
    said controller executes a program for controlling the charge current provided to the one of said batteries for charging the one of said batteries based on whether a battery is installed in that station, and also based on a state of charge determined by the controller using the temperature data, the battery voltage data, and the current data of the one of the batteries, such that the charging of the one of the batteries is independently controlled based on the determined current state-of-charge of the one of the batteries, and wherein
  said controller is adapted to detect whether any of said batteries is defective based on the determined state of charge, and wherein
  a charge status of each one of the battery charging stations is displayed on the display, said charge status indicating whether any given charge station has no battery installed and if a battery is installed, indicating whether the battery is being charged, has been charged, is defective, or is too cold to charge.

14. The system of claim 13, wherein the controller is adapted such that, once disconnected, the at least one switch does not reconnect the one of said batteries until another battery is provided to replace said one of said batteries.

15. The system of claim 13, wherein the controller is adapted to detect when any of the batteries is below a temperature threshold for disconnection from the charge current source to stop charging such battery(s).

16. The system of claim 13, wherein the station detectors detect a battery being present by detecting a residual voltage of the battery when the battery is electrically connected to the system.

17. A method of charging a plurality of batteries, comprising the steps of:
  providing a plurality of battery charging stations;
  for each one of said battery charging stations, detecting whether a battery is present in the battery charging station;
  connecting each one of said batteries to a battery charging source for charging said batteries;
  detecting a current being provided to each one of the batteries by the battery charging source;

detecting a current voltage of each one of the batteries;
detecting a current temperature of each one of the batteries;
for each one of the batteries, determining a state of charge of the battery based on the detected current, the detected current voltage, and the detected current temperature;
charging the batteries based on the determined state of charge of each battery, such that any defective batteries are disconnected from charging and any batteries that are too cold are disconnected from charging, while any batteries that are not fully charged continue to be charged until they are fully charged; and
displaying to an operator a charging status of each one of the batteries.

18. The method of claim 17, wherein any batteries that are disconnected because of being too cold are reconnected and charged when their temperature rises above a minimum threshold.

19. The method of claim 17, wherein, when a battery has been disconnected for being a defective battery, that battery station cannot be reconnected until the defective battery is removed and replaced.

\* \* \* \* \*